Figure 1:
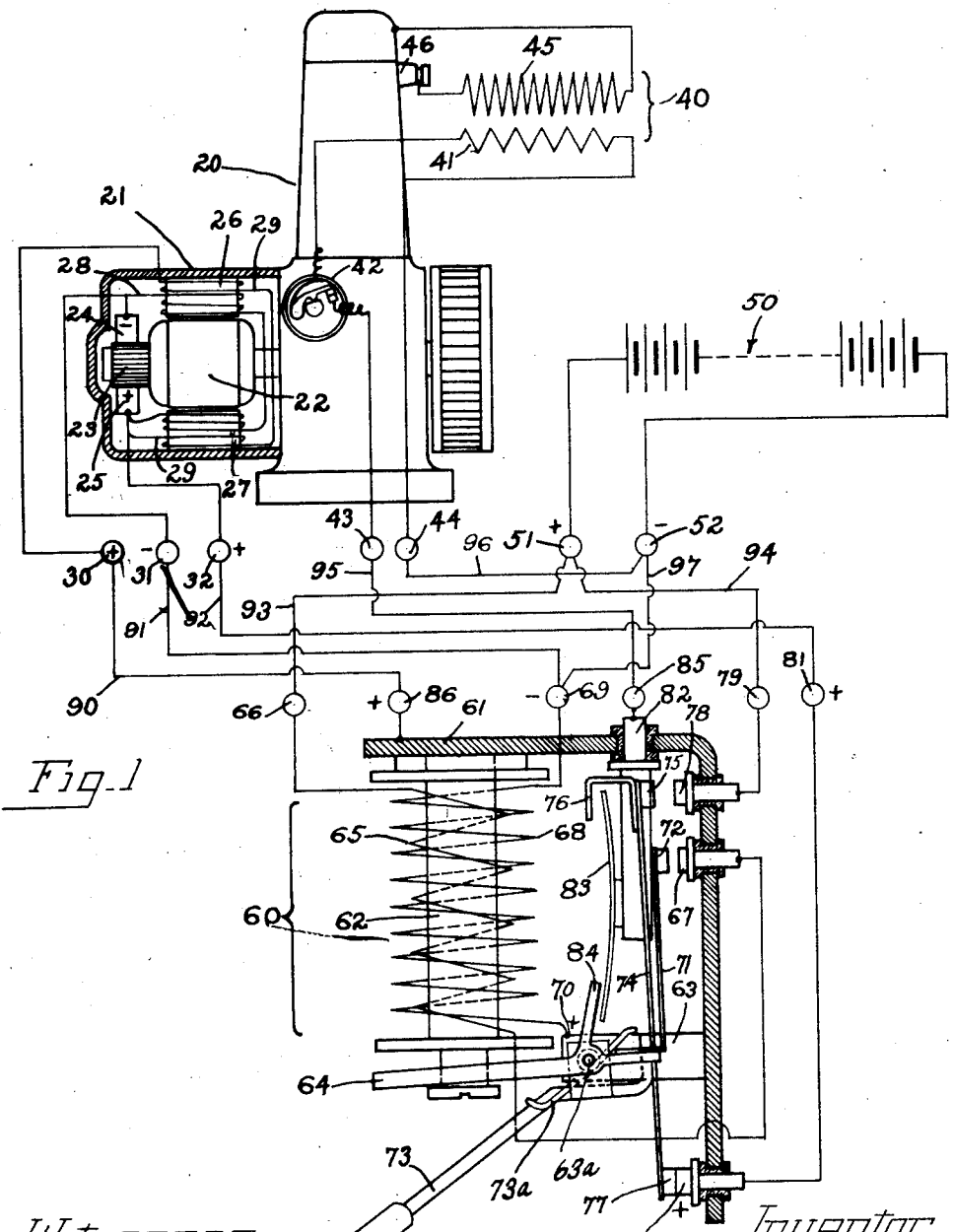

Oct. 13, 1925.  
H. P. BRAEUTIGAM  
ELECTRICAL SYSTEM  
Filed May 12, 1919   2 Sheets-Sheet 1

1,556,673

ENGINE CRANKING

CHARGING
First Position

CHARGING
Second Position

Patented Oct. 13, 1925.

1,556,673

UNITED STATES PATENT OFFICE.

HENRY P. BRAEUTIGAM, OF DAYTON, OHIO, ASSIGNOR, BY MESNE ASSIGNMENTS, TO DELCO-LIGHT COMPANY, OF DAYTON, OHIO, A CORPORATION OF DELAWARE.

ELECTRICAL SYSTEM.

Application filed May 12, 1919. Serial No. 296,503.

*To all whom it may concern:*

Be it known that I, HENRY P. BRAEUTIGAM, a citizen of the United States of America, residing at Dayton, county of Montgomery, State of Ohio, have invented certain new and useful Improvements in Electrical Systems, of which the following is a full, clear, and exact description.

This invention relates to electrical systems including a storage battery and a dynamo driven by an internal-combustion engine, the dynamo operable as a motor to start the engine or as a dynamo driven by the engine for charging the storage battery.

One of the objects of the invention is to control the circuit connections between the dynamo and the storage battery in such a manner that when the output of the dynamo, operating as a generator, reaches a predetermined value, the generator will be automatically connected with the storage battery for charging purposes; and that this connection be made as early as possible after the engine has become self-operative. It is a further object that this connection, if made at all, shall be of such a nature as to insure the carrying of current from the generator to the battery without undue resistance or injurious heating effects to the circuit-controlling devices.

In furtherance of the above mentioned objects, there is provided a controller having a manually operable lever for closing a main circuit (cranking circuit) from the battery to the dynamo to operate the latter as a motor with series characteristics to crank the engine and for connecting a shunt controller winding across the terminals of the battery. When the engine becomes self operative, and the dynamo begins to function as a generator to charge the battery, the said shunt controller winding, under the influence of the higher generator voltage, actuates an armature to close a second main circuit (charging circuit) from the battery to the dynamo, which circuit includes a series winding adapted to assist the shunt controller winding to maintain the charging circuit closed so long as the generator charges the battery and to open the charging circuit upon any reversal of current in the charging circuit. After the charging circuit is thus established, the manually operable lever may be moved to a second position to open the first-mentioned (cranking) circuit and to close a third main circuit for changing the operating characteristics of the dynamo from series to shunt by short-circuiting the series field winding. A characteristic of the controller described is that all the current passes through the frame thereof while the first-mentioned or cranking circuit is closed. Provision is also made for closing an engine ignition circuit when the manually operable lever is moved to establish the cranking circuit, and to close a second ignition circuit when the armature is actuated to establish the second or charging circuit, whereby engine ignition will be assured when the manually controlled lever is moved to another position as described.

Other and further objects and advantages of the present invention will be apparent from the following description, reference being had to the accompanying drawing, wherein a preferred form of embodiment of the present invention is set forth.

Figure 2:
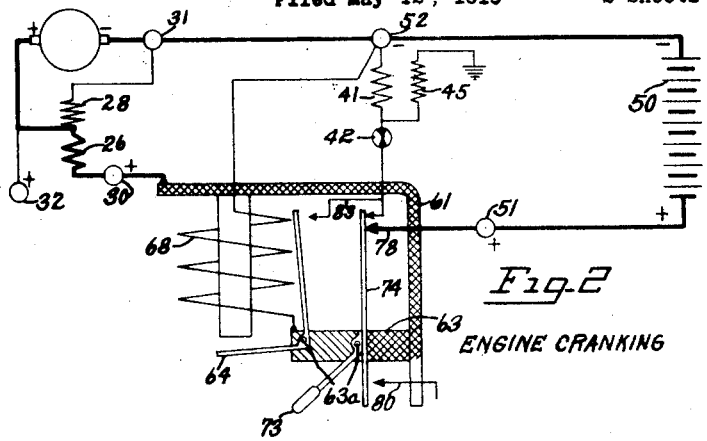
Figure 3:
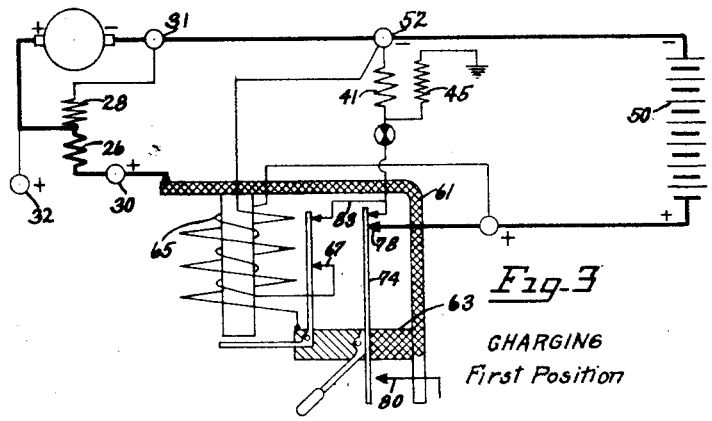
Figure 4:
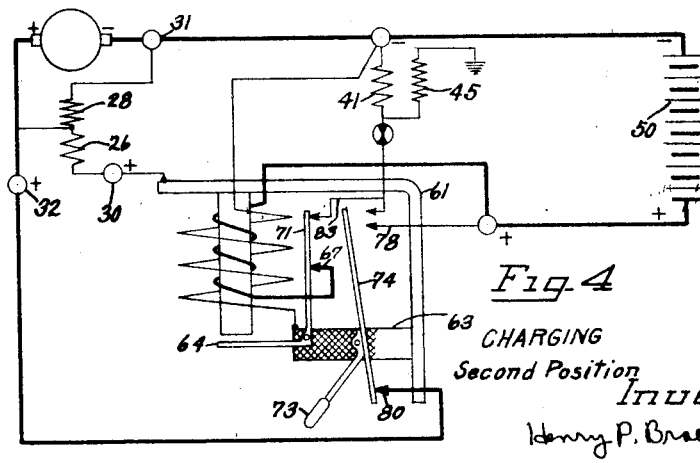

Fig. 1 shows diagrammatically a side elevation of an internal-combustion engine, together with a dynamo driven thereby, certain parts of the dynamo being shown in section, and together with a wiring diagram including a diagrammatic representation of the circuit-controlling device. Figs. 2, 3 and 4 are simplified diagrams showing the circuits established during the various operating conditions.

Referring to the drawings, 20 designates an internal-combustion engine driving a dynamo 21 which is directly connected with the engine. Dynamo 21 includes armature 22, commutator 23, brushes 24 and 25, and field pole pieces 26 and 27. The dynamo is provided with the shunt field 28 connected across brushes 24 and 25, and with a series field 29, one end of which is connected with brush 25, and the other with dynamo terminal 30. Brush 24 is connected with terminal 31, and brush 25 with terminal 32.

Ignition for the engine is furnished through the agency of ignition coil 40 which includes a primary 41 connected with timer 42, which in turn is connected with ignition terminal 43. The other end of the primary 41 is connected with ignition terminal 44. Secondary winding 45 is connected at one end with spark plug 46 and grounded at the other upon the engine.

50 designates a storage battery the positive side of which is connected with terminal 51, and the negative side with the terminal 52.

The controller 60 will now be described. This controller includes a frame 61 of magnetic material supporting a magnet core 62 and an armature post 63. Post 63 supports a pivotally mounted armature 64. A magnetic circuit is formed by members 62, 61, 63, and 64 with a gap between the armature 64 and the core 62. Upon the core 62 is mounted a series magnet winding 65, one end being connected with terminal 66 and the other with contact 67. The core 62 also supports a shunt magnet winding 68, one end being connected with terminal 69 and the other end being connected at 70 with the armature post 63 and frame 61 which is connected with the positive side of the generating circuit. Armature 64 carries a leaf spring 71 of conducting material, the outer end of which carries a contact 72 which cooperates with contact 67.

Switch lever 73, pivotally mounted upon pin 63ᵃ carried by post 63, carries intermediate the ends thereof, a spring conducting member 74, one end of which carries contacts 75 and 76, and the other end of which carries a contact 77. Contact 75 cooperates with contact 78 which is connected with controller terminal 79. The contact 77 cooperates with contact 80 which is connected with controller terminal 81. Spring 73ᵃ encircles the pin 63ᵃ and one end thereof bears against lever 73 and the other, against post 63. This spring 73ᵃ serves normally to maintain lever 73 in the position shown in the drawing with contacts 77 and 80 closed.

A post 82 supported by frame 61, but insulated therefrom, supports intermediate the ends thereof a resilient conducting member 83, one end of which cooperates with contact 76 and the other with a lug 84 forming a part of the armature 64.

The post 82 is connected with controller terminal 85. The frame 61 is connected with controller terminal 86. Wire 90 connects terminals 30 and 86. Wire 91 connects terminals 31 and 69. Wire 92 connects terminals 32 and 81. Wire 93 connects terminals 66 and 51. Wire 94 connects terminals 51 and 79. Wire 95 connects terminals 43 and 85. Wire 96 connects terminals 44 and 52. Wire 97 connects terminals 52 and 69.

The operation of the invention is as follows: To start the engine the controller lever 73 is pulled upwardly; that is, rotated in a clock-wise direction, causing contacts 77 and 80 to be separated and engagement to be made between the contacts 75 and 78, and contact 76 and conductor 83. The following circuits will then be established: The cranking circuit, which is termed a main circuit, includes battery 50, terminal 51, wire 94, contact 78, contact 75, conductor 74, armature post 63, frame 61, terminal 86, wire 90, terminal 30, series-field winding 29, brush 25, armature 22, brush 24, terminal 31, wire 91, terminal 69, wire 97, and terminal 52 back to the battery 50. When this occurs the dynamo 21 will operate as a compound-wound motor with both series and shunt fields energized. The ignition circuit includes battery 50, terminal 51, wire 94, contact 78, contact 75, contact 76, conductor 83, post 82, terminal 85, wire 95, terminal 43, timer 42, ignition coil primary winding 41, terminal 44, wire 96, terminal 52, back to the battery 50. It will be noted that the connections between the battery and the ignition apparatus, and the battery and the dynamo are effected manually by means of the lever 73 without in any way affecting the position of the armature 64. This is illustrated in Fig. 2.

When the engine becomes self-operative its speed will soon increase above the speed of the dynamo, operating as a motor, and will then drive the dynamo as a generator to charge the battery. At a predetermined engine speed the voltage across the dynamo brushes 24 and 25 will reach such a value that the voltage or shunt coil 68 which is connected across the generator brushes will be energized sufficiently to cause the attraction of the armature 64. This condition is best shown in Fig. 3. The controller lever 73 may then be released and will then return under the action of gravity and spring 73ᵃ, to the position shown in the drawing. The attraction of the armature 64 will effect the closing of contacts 72 and 67 and the engagement of lug 84 with the conductor 83. When this occurs the following circuit will be established: The battery charging circuit, which is herein also termed a main circuit, will include the dynamo terminal 32, wire 92, controller terminal 81, contact 80, contact 77, lever 73, post 63, armature 64, conductor 71, contact 72, contact 67, series coil 65, terminal 66, wire 93, battery terminal 51, battery 50, terminal 52, wire 97, wire 91, to dynamo terminal 31. During the generating operation of the dynamo the series field 29 is short-circuited by the engagement of contacts 77 and 80 which establishes a path between the terminal 32 and armature 64 which is of much less resistance than the path from generator brush to the series winding 29 and around through terminal 30, wire 90, terminal 86, and frame 61 to armature 64. The dynamo now acts as a shunt-wound generator. The connections just described are shown in simplified form in Fig. 4. It will be observed that the circuit thus established by the actuation of the armature 64, as illustrated in Fig. 3, is a main circuit between the dynamo and the battery, and that the series controller winding 65 included in this second main circuit is in parallel with that portion of the first main circuit, or cranking circuit, which includes the switch conductor 74. The third main circuit, or charging circuit, as illustrated in Fig. 4, includes the series controller winding 65 of the second main circuit, and as a consequence it may be said that the shunt controller winding 68 by actuating the armature 64 conditions the so-called third main or charging circuit, whereby the latter may be established upon the return of controller lever 73 to its initial position, the series field winding 26 of the dynamo being inoperative while the third main or charging circuit is thus closed. Thereafter, the series winding 65 in the third main circuit cooperates with the shunt winding 68 to thereafter control the third main or charging circuit, the arrangement being such that the series winding 65 causes the charging circuit to be opened upon a reversal of current flow therein.

The following ignition circuit is also established by the upward movement of armature 64: Generator terminal 32, wire 92, terminal 81, contacts 80 and 77, conductor 74, lever 73, armature 64, lug 84, conductor 83, post 82, terminal 85, wire 95, terminal 43, timer 42, primary 41, terminal 44, wire 96, wire 97, wire 91, and generator terminal 31.

It will be noted that before the armature 64 is moved magnetically into circuit closing position, the series coil 65 is not connected in the circuit between the battery and dynamo, but that during the starting operation when the lever 73 is pulled upwardly, the circuit through the winding 65 is broken and a separate circuit is established by virtue of closing the contacts 75 and 78. Therefore it is apparent that current will flow through the series coil 65 in one direction only, since it is connected with the battery and dynamo only during the charging operation. Therefore there will be no reversal of polarity of the controlling magnet. In electrical systems in which reverse current relays are used, and the series controlling winding is connected in series with the battery and dynamo during the starting operation, the magnetic flux of the controller will be in a certain direction producing a corresponding polarity of the magnet. Then when the engine becomes self-operative and drives the dynamo as a generator to charge the battery, the current through the series controlling winding is reversed, resulting in a reversal of the polarity of the magnet. On account of the residual magnetism in the iron of the controller created by the passage of current through the series winding during the cranking operation an additional amount of current must pass through the voltage winding in order to overcome this residual magnetism, before the armature can be attracted. The result is that the voltage across the generator brushes would have to be higher in a case where it is necessary to overcome this residual magnetism and effect the reversal of polarity.

In the present invention this difficulty is eliminated, since there is no reversal of polarity in the controller, and hence no residual magnetism to be overcome. The result is that the generator will begin to charge the battery at a lower engine speed, since all the shunt winding 68 has to do is to overcome the action of gravity on the armature 64, and also to place sufficient tension in the resilient conducting members 83 and 71 to insure a good contact. It will be noted also that the armature 64 is not moved manually into contact closing position, but that this movement is entirely automatic and beyond the control of the operator. It will be noted also that the armature 64 is comparatively heavy so that the action of gravity in opposing the attractive force created by shunt winding 68 is considerably greater than the resistance offered by the resilient conducting members 83 and 71. The result is that if the energy produced in the magnet through the tendency of the shunt winding 68 is great enough to overcome the force of gravity acting on armature 64, it will then be great enough to place sufficient tension in resilient conductors 83 and 71 to insure a good contact, for the reason that as the gap between the armature 64 and core 62 decreases the holding power of the magnet will rapidly increase.

If the speed of the engine should decrease to so low a value that the magnet cannot overcome the action of gravity on armature 64, the armature will immediately drop down to circuit opening position without stopping at any half-way position, by reason of the fact that the force of gravity is large relatively to the force exerted by the resilient contact members 83 and 71 against the attractive force of the magnet. To be more explicit, when this attractive force is weakened and there is a movement of the armature 64 towards circuit opening position, there is also a weakening of the resistance formed by the contact members 83 and 71. However this decrease in resistance to the magnetic attraction formed by the members 83 and 71 is overbalanced by a much greater decrease in attractive power, due to the increase in gap between the armature 64 and core 62. In other words, the action of gravity on armature 64 can do more to increase this gap than a release of tension in the resilient conductors 83 and 71 can do to assist the magnet to tend to decrease this gap and maintain the armature in attracted position. Therefore it is apparent that contacts 72 and 67 will either be maintained in engagement with sufficient pressure to insure the proper carrying of the current without undue resistance or injurious heating effects, or else these contacts will be entirely separated.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What I claim is as follows:

1. In an electrical system, the combination with an engine; of a dynamo operable as a motor to start the engine, or as a generator driven by the engine; a storage battery; and a controller comprising a support of conducting material, means establishing a circuit through said support for connecting the battery with the dynamo to operate the same as a motor, and means for establishing a second circuit, not including said support, for connecting the battery with the dynamo when operating as a generator.

2. In an electrical system, the combination with an engine; of a dynamo operable as a motor to start the engine, or as a generator driven by the engine; a storage battery; and a controller comprising a support of conducting material, means for establishing a circuit between the battery and the dynamo to operate the same as a motor, and means for establishing a second circuit between the battery and the dynamo when operating as a generator, said support being included in one of said circuits.

3. In an electrical system, the combination with an engine; of a dynamo operable as a motor to start the engine, or as a generator driven by the engine; a storage battery; and a controller comprising a support of conducting material, means establishing a circuit through said support for connecting the battery with the dynamo to operate the same as a motor, and means for establishing a second circuit for connecting the battery with the dynamo when operating as a generator, said second means having provisions for short circuiting said support when the dynamo is operating as a generator.

4. In an electrical system, the combination with an engine; of a dynamo operable as a motor to start the engine, or as a generator driven by the engine; a storage battery; and a controller comprising a support of conducting material, manual means for establishing a circuit between the battery and the dynamo to operate the same as a motor, and means for automatically establishing a second circuit between the battery and the dynamo when operating as a generator, said support being included in one of said circuits.

5. In an electrical system, the combination with an engine; of a dynamo comprising series and shunt field windings and operable as a motor to start the engine, or as a generator driven by the engine; a storage battery; and a controller comprising a support of conducting material, means for establishing a circuit, including said series field winding and said support, for connecting the battery with the dynamo to operate the same as a motor with series characteristics, and means for establishing a second circuit, exterior of said series field winding and said support, between the battery and dynamo whereby the latter may operate as a generator with shunt characteristics.

6. In an electrical system, the combination with an engine; of a storage battery; a dynamo adapted to operate with either shunt or compound characteristics, and operable as a motor to crank the engine or as a generator driven by the engine to charge the battery; means including a controller for connecting the dynamo with the battery, said controller having a shunt winding, manually controlled means movable from a first position into a second position for establishing a main circuit between the battery and dynamo and for connecting said shunt winding in parallel with the dynamo, and magnetic means controlled by said shunt winding for conditioning another main circuit between the battery and dynamo whereby said second-mentioned main circuit may be established upon the return of said manually-controlled means to its said first position to change the operating characteristics of the dynamo.

7. In an electrical system, the combination with an engine; of a storage battery; a dynamo adapted to operate with shunt or compound characteristics and operable as a motor to crank the engine or as a generator driven by the engine to charge the battery; means including a controller for connecting the dynamo in a main circuit with the battery, said controller having manually-controlled means movable from a first position into a second position for establishing said main circuit between the battery and the dynamo, and means responsive to the voltage of the dynamo for conditioning another main circuit whereby said second-mentioned main circuit may be subsequently established upon the return of said manually-controlled means to its said first position to change the operating characteristics of the dynamo.

8. In an electrical system, the combination with an engine; of a storage battery; a dynamo adapted to operate with shunt or compound characteristics and operable as a motor to crank the engine or as a generator driven by the engine to charge the battery; means including a controller for connecting the dynamo in a main circuit with the battery, said controller having manually-controlled means movable from a first position into a second position for establishing said main circuit between the battery and the dynamo, and means including a winding connected in parallel with the dynamo for conditioning another main circuit whereby said second-mentioned main circuit is established by the return of said manually-controlled means to its said first position to change the operating characteristics of the dynamo.

9. In an electrical system, the combination with an engine; of a storage battery; a dynamo adapted to operate with shunt or compound characteristics and operable as a motor to crank the engine or as a generator driven by the engine to charge the battery; means including a controller for connecting the dynamo in a main circuit with the battery, said controller having manually-controlled means movable from a first position into a second position for establishing said main circuit between the battery and the dynamo, and electromagnetic means including a winding connected in parallel with the dynamo for conditioning another main circuit whereby said second-mentioned main circuit may be established upon the return of said manually-controlled means to its first position to change the operating characteristics of the dynamo, said second-mentioned main circuit including a winding so arranged as to open said second-mentioned circuit upon a subsequent reverse flow of current therein.

10. In an electrical system, the combination with an engine; of a storage battery; a dynamo adapted to operate with shunt or compound characteristics and operable as a motor to crank the engine or as a generator driven by the engine to charge the battery; means including a controller for connecting the dynamo in a main circuit with the battery, said means having manually-controlled means movable from a first position into a second position for establishing said main circuit between the battery and the dynamo, and electro-magnetic means including a winding connected in parallel with the dynamo for conditioning another main circuit whereby said second-mentioned main circuit may be established upon the return of said manually-controlled means to its said first position to change the operating characteristics of the dynamo, said second-mentioned circuit including a series winding adapted to cooperate with said first-mentioned winding for thereafter controlling said second-mentioned main circuit.

11. In an electrical system, the combination with an engine; of a storage battery; a dynamo adapted to operate with shunt or compound characteristics and operable as a motor to crank the engine or as a generator driven by the engine to charge the battery; means including a controller for connecting the dynamo in a main circuit with the battery, said controller having manually-controlled means movable from a first position into a second position for establishing said main circuit between the battery and the dynamo; and electro-magnetic means including a shunt winding in parallel with the dynamo for conditioning another main circuit whereby said second-mentioned main circuit may be established upon the return of said manually-controlled means to its said first position, to change the operating characteristics of the dynamo, said second-mentioned main circuit including a series winding adapted to cooperate with said shunt winding for thereafter controlling said second-mentioned circuit and operating in opposition to said shunt winding upon a reversal of current in the second-mentioned circuit.

12. In an electrical system, the combination with an engine; of a storage battery; a dynamo having a field winding, said dynamo being operable as a motor to crank the engine or as a generator driven by the engine to charge the battery; ignition means for the engine; control means for controlling the connection between the dynamo and battery and the ignition means, said control means comprising a manually-controlled means movable from a first position into a second position for establishing a main circuit between the battery and the dynamo and for establishing an ignition circuit, means responsive to the voltage of the dynamo for establishing a second ignition circuit and for conditioning a second main circuit between the dynamo and battery whereby return of the manually-controlled means to its said first position closes said second-mentioned main circuit.

13. In an electrical system, the combination with an engine; of a storage battery; a dynamo having a field winding, said dynamo being operable as a motor to crank the engine or as a generator driven by the engine to charge the battery; ignition means for the engine; control means for controlling the connection between the dynamo and battery and the ignition means, said control means comprising a manually-controlled means movable from a first position to a second position for establishing a main circuit between the battery and the dynamo and for establishing an ignition circuit, means responsive to the voltage of the dynamo for establishing a second ignition circuit and for conditioning a second main circuit between the dynamo and battery whereby return of the manually-controlled means to its said first position closes said second-mentioned main circuit, said second-mentioned main circuit having means cooperating with said voltage-responsive means for thereafter controlling said second ignition circuit.

In testimony whereof I affix my signature.

HENRY P. BRAEUTIGAM.